(12) United States Patent
Blackman

(10) Patent No.: US 9,663,287 B1
(45) Date of Patent: May 30, 2017

(54) WINDSHIELD WIPER COVER

(71) Applicant: Steven Blackman, Bellport, NY (US)

(72) Inventor: Steven Blackman, Bellport, NY (US)

( * ) Notice: Subject to any disclaimer, the term of this patent is extended or adjusted under 35 U.S.C. 154(b) by 0 days.

(21) Appl. No.: 15/168,629

(22) Filed: May 31, 2016

(51) Int. Cl.
*B65D 85/68* (2006.01)
*B60S 1/04* (2006.01)

(52) U.S. Cl.
CPC ............ *B65D 85/68* (2013.01); *B60S 1/0491* (2013.01); *B65D 2585/6885* (2013.01)

(58) Field of Classification Search
CPC ............ B65D 2585/6885; B65D 85/68; B60S 1/0491
USPC .......................... 206/335, 461, 471; 150/166
See application file for complete search history.

(56) References Cited

U.S. PATENT DOCUMENTS

| | | | | |
|---|---|---|---|---|
| 2,141,023 A * | 12/1938 | Ryan | ...................... | B60S 1/524 15/250.03 |
| 3,021,548 A * | 2/1962 | Stoller | ...................... | B60S 1/38 15/246 |
| 3,199,563 A * | 8/1965 | Forrest | ................. | B60S 1/0491 15/246 |
| 4,293,975 A * | 10/1981 | Ainsworth | ............ | B60S 1/0491 15/105 |
| 4,342,126 A | 8/1982 | Neefeldt | | |
| 5,571,221 A | 11/1996 | Kuo | | |
| 5,628,084 A | 5/1997 | Chen | | |
| 6,327,728 B1 * | 12/2001 | Hart | ......................... | B25F 1/00 7/105 |
| 6,588,046 B1 | 7/2003 | Lee | | |
| 6,760,951 B1 * | 7/2004 | Wynen | .................. | B60S 1/3801 15/245 |
| 6,859,971 B2 * | 3/2005 | Siklosi | .................. | B60S 1/3801 15/250.001 |
| D577,324 S | 9/2008 | McCray | | |
| 8,104,136 B2 * | 1/2012 | Carangelo | ............. | B60S 1/3801 15/250.361 |
| 9,434,515 B2 * | 9/2016 | Sparenberg, Sr. | ..... | B65D 37/00 |
| 2005/0235448 A1 * | 10/2005 | Richard | ................ | B60S 1/0491 15/257.01 |
| 2011/0192511 A1 | 8/2011 | Marrone | | |
| 2013/0105343 A1 * | 5/2013 | Bult | ...................... | B65D 75/22 206/349 |
| 2016/0304057 A1 * | 10/2016 | Berry | .................... | B60S 1/0491 |

FOREIGN PATENT DOCUMENTS

CA        2731019 A1        8/2011

* cited by examiner

*Primary Examiner* — Steven A. Reynolds

(57) ABSTRACT

The windshield wiper cover is adapted for use with windshield wipers. The windshield wiper cover is a container within which the windshield wiper is stored during inclement weather such that ice and dirt do not build up on the windshield wiper when the vehicle is not in use. The windshield wiper cover is a structure that is formed in the shape of an irregular prism. In a first potential embodiment of the disclosure, the windshield wiper cover comprises a tray and a top cap. In a second potential embodiment of the disclosure, the tray and top cap are combined into a single unit.

6 Claims, 3 Drawing Sheets

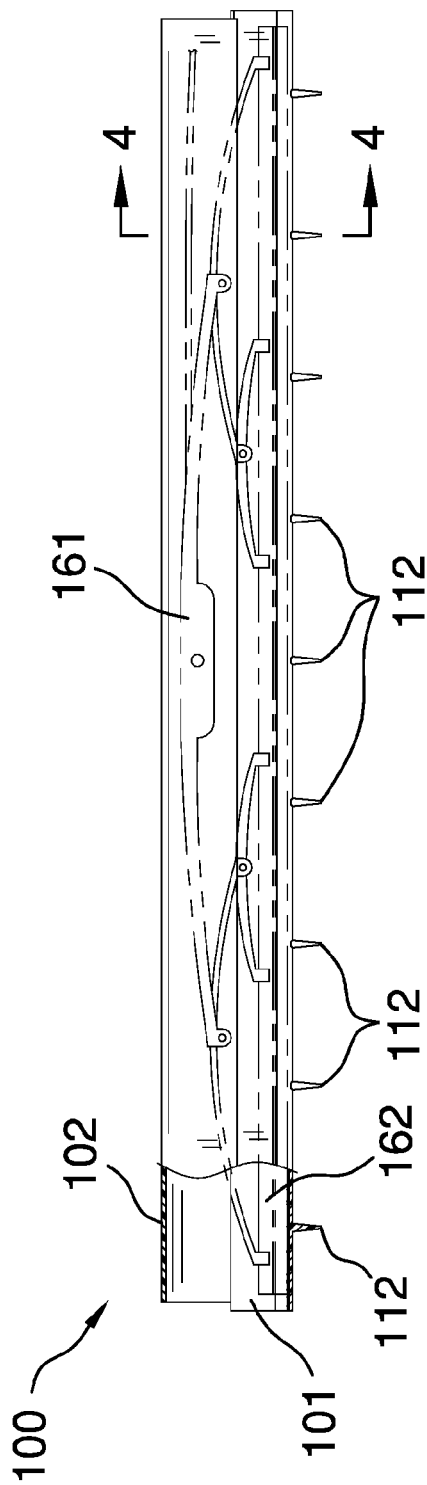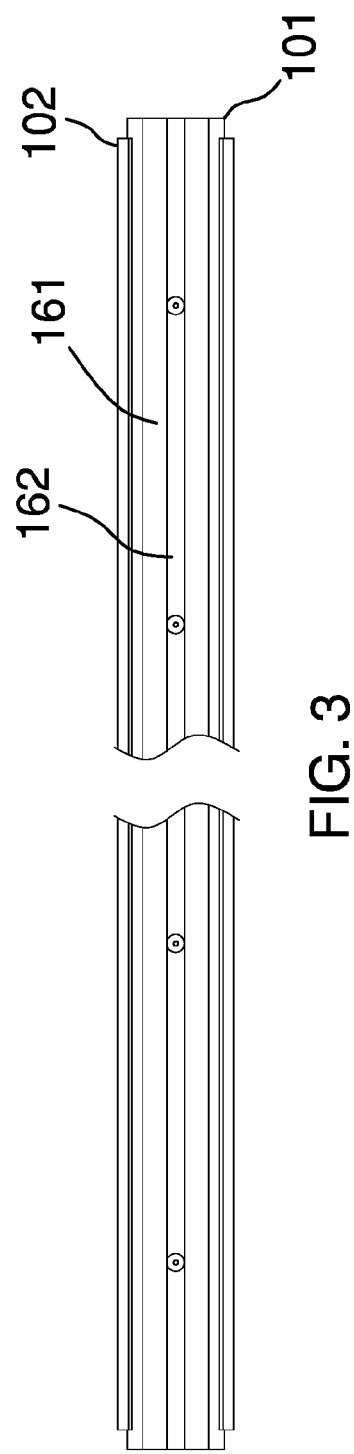

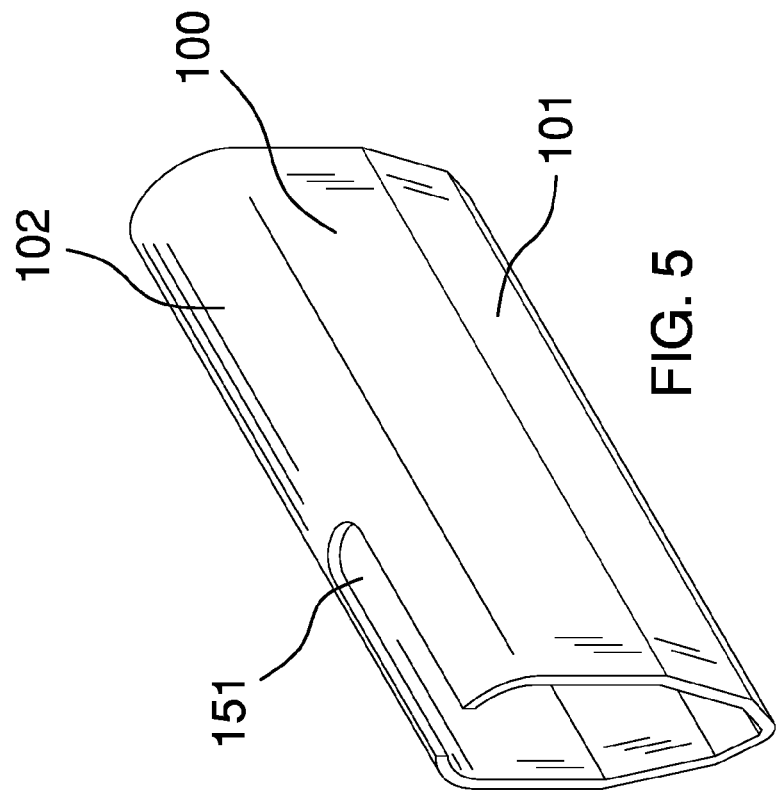
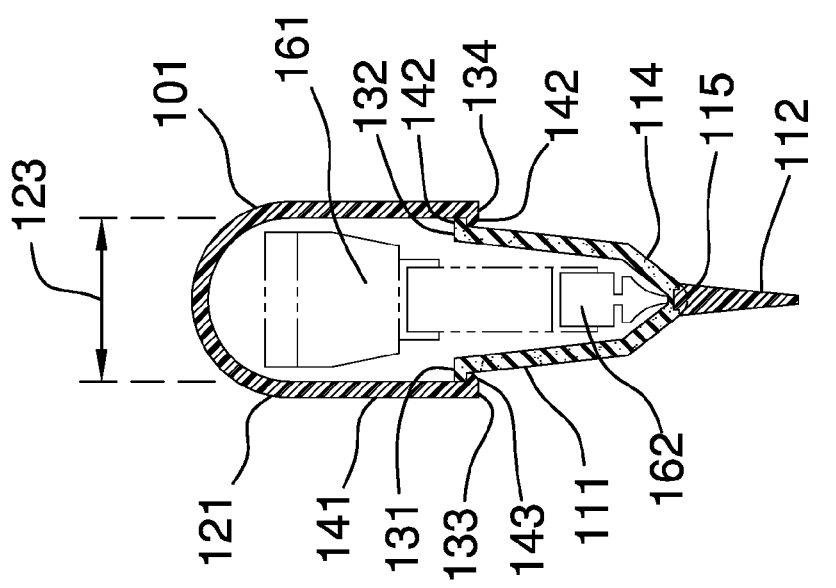
FIG. 5
FIG. 4

WINDSHIELD WIPER COVER

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of containers for the storage or transport of objects, more specifically, a portable container not otherwise provided for.

SUMMARY OF INVENTION

The windshield wiper cover is adapted for use with windshield wipers. The windshield wiper cover is a container within which the windshield wiper is stored during inclement weather such that ice and dirt do not build up on the windshield wiper when the vehicle is not in use. The windshield wiper cover is a structure that is formed in the shape of an irregular prism. In a first potential embodiment of the disclosure, the windshield wiper cover comprises a tray and a top cap. In a second potential embodiment of the disclosure, the tray and top cap are combined into a single unit.

These together with additional objects, features and advantages of the windshield wiper cover will be readily apparent to those of ordinary skill in the art upon reading the following detailed description of the presently preferred, but nonetheless illustrative, embodiments when taken in conjunction with the accompanying drawings.

In this respect, before explaining the current embodiments of the windshield wiper cover in detail, it is to be understood that the windshield wiper cover is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the windshield wiper cover.

It is therefore important that the claims be regarded as including such equivalent construction insofar as they do not depart from the spirit and scope of the windshield wiper cover. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

FIG. 2 is a side view of an embodiment of the disclosure.

FIG. 3 is a bottom view of an embodiment of the disclosure.

FIG. 4 is a cross-sectional view of an embodiment of the disclosure across 4-4 as shown in FIG. 2.

FIG. 5 is a perspective view of an alternate embodiment of the disclosure.

DETAILED DESCRIPTION OF THE EMBODIMENT

Figure 1:
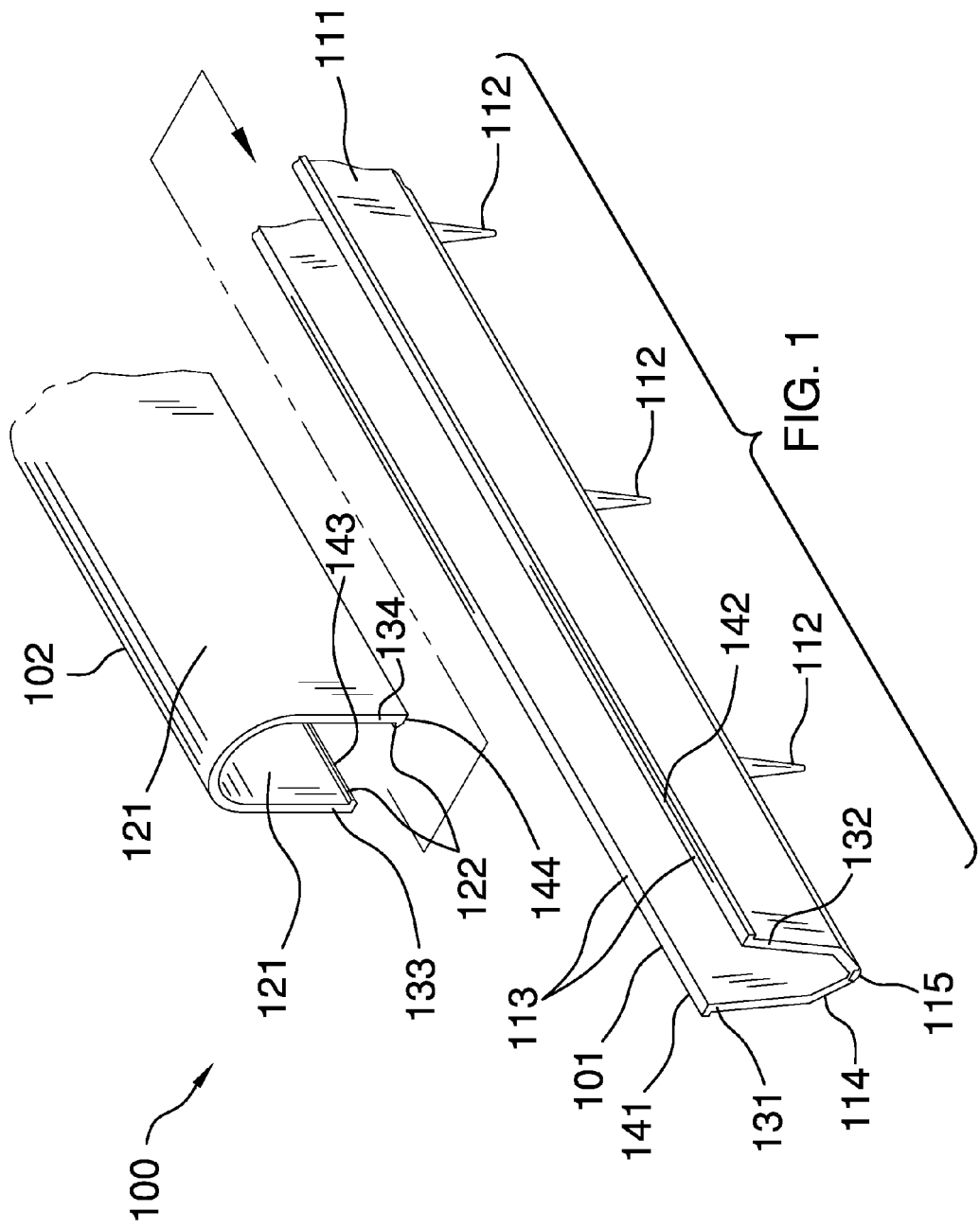
FIG. 1 is a perspective view of an embodiment of the disclosure.

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Detailed reference will now be made to a plurality of potential embodiments of the disclosure, which are illustrated in FIGS. 1 through 5.

In a first potential embodiment of the disclosure, the windshield wiper cover 100 (hereinafter invention) comprises a tray 101 and a top cap 102. The invention 100 is adapted for use with a windshield wiper assembly 161. The invention 100 is a container within which the windshield wiper assembly 161 is stored during inclement weather such that ice and dirt do not build up on the windshield wiper when the vehicle is not in use. The invention 100 is a structure that is formed in the shape of an irregular prism. In a second potential embodiment of the disclosure, the tray 101 and top cap 102 are combined into a single unit.

The tray 101 is a hollow structure within which the bottom portion of the wiper assembly 161 is stored. The tray 101 further comprises a boot 111, a plurality of contact points 112, and a first plurality of latch ridges 113. As shown most clearly in FIG. 1, the boot 111 is a trough shaped prism that further comprises a V shaped structure 114. The edge of the boot 111 that is distal from the V shaped structure 114 is open such that the boot 111 can receive the bottom portion of the wiper assembly 161 for storage. The V shaped structure 114 receives the bottom portion of the wiper assembly 161 such that the wiper blade 162 will fit into the V shaped structure 114.

As shown in FIG. 1, the tray 101 further comprises a first edge 131 and a second edge 132. The first edge 131 and the second edge 132 are the edges that: 1) are distal from the vertex 115; and, 2) run in a direction parallel to the direction of the vertex 115. Each of the plurality of contact points 112 is a collection of structures that project away from the vertex 115 in the direction away from the first edge 131 and the second edge 132. The purpose of the plurality of contact points 112 is to rest on the windshield of an automobile such that the balance of the invention 100 is raised above the windshield. This prevents the invention 100 from being irremovably frozen to the windshield during inclement weather.

In the first potential embodiment of the disclosure, as shown in FIG. 1, each of the plurality of contact points 112 is formed in the shape of a cone. The first plurality of latch ridges 113 is a collection of ridges that are formed on the boot 111. The first plurality of latch ridges 113 interact with the top cap 102 such that the tray 101 and the top cap 102 can be attached to each other. This interaction is discussed elsewhere in this disclosure. Each of the first plurality of latch ridges 113 projects perpendicularly away from the exterior surface of the boot 111.

In the first potential embodiment of the disclosure, as shown most clearly in FIGS. 1 and 4, the first plurality of latch ridges 113 further comprises a first latch ridge 141 and a second latch ridge 142. The first latch ridge 141 projects perpendicularly away from the boot 111 as an extension of the first edge 131 in a direction away from the second edge 132. The second latch ridge 142 projects perpendicularly away from the boot 111 as an extension of the second edge 132 in a direction away from the first edge 131.

In the first potential embodiment of the disclosure, the tray 101 is formed as a single unit from molded plastic. Suitable plastics include, but are not limited to, polyethylene or polyvinylchloride.

The top cap 102 further comprises a chamber 121 and a second plurality of latch ridges 122. The chamber 121 is a hollow U shaped prism that is further defined with a third edge 133 and a fourth edge 134. The span between the third edge 133 and the fourth edge 134 is defined as the gap 123. As shown in most clearly in FIG. 4, the span of the gap 123 of the top cap 102 is sized such that the chamber 121 will fit over the tray 101. The span of the gap 123 between the third edge 133 and the fourth edge 134 is open thereby allowing the top cap 102 to slide over the tray 101 when the wiper assembly 161 is inserted in the tray 101. Each of the second plurality of latch ridges 122 is a ridge that projects perpendicularly away from the interior surface of the chamber 121.

In the first potential embodiment of the disclosure, as shown most clearly in FIGS. 1 and 4, the second plurality of latch ridges 122 further comprises a third latch ridge 143 and a fourth latch ridge 144. The third latch ridge 143 projects perpendicularly away from the chamber 121 as an extension of the third edge 133 in a direction towards the fourth edge 134. The fourth latch ridge 144 projects perpendicularly away from the chamber 121 as an extension of the fourth edge 134 in a direction towards the third edge 133.

In the first potential embodiment of the disclosure, the top cap 102 is formed as a single unit from molded plastic. Suitable plastics include, but are not limited to, polyethylene or polyvinylchloride.

In the first potential embodiment of the disclosure, as shown most clearly in FIGS. 1 and 4, the tray 101 and the top cap 102 are attached to form a single unit by sliding the top cap 102 over the tray 101 in such a manner that the third latch ridge 143 and the fourth latch ridge 144 are physically between the first latch ridge 141 and the vertex 115 and the second latch ridge 142 and the vertex 115 respectively. As shown most clearly in FIG. 4, in this configuration the first latch ridge 141 interacts with the third latch ridge 143 and the second latch ridge 142 interact with the fourth latch ridge 144 in such a way that the top cap 102 cannot be readily removed from the tray 101.

In a second potential embodiment of the disclosure, as shown most clearly in FIG. 5, the tray 101 and top cap 102 are formed from as a single unit from molded plastic. Suitable plastics include, but are not limited to, polyethylene or polyvinylchloride. In this second potential embodiment of the disclosure, the first plurality of latch ridges 113 and the second plurality of latch ridges 122 are no longer necessary. An assembly slot 151 is formed in the chamber 121 to accommodate the connection of the wiper assembly 161 to the vehicle when the invention 100 is slid into position.

To use the first potential embodiment of the disclosure, as shown most clearly in FIGS. 1 and 2, the bottom portion of the wiper assembly 161 is placed into the tray 101 and the top cap 102 is slid over the wiper assembly 161 to contain the wiper assembly 161 within the invention 100. The invention 100 is later removed before the vehicle is operated.

To use the second potential embodiment of the disclosure, as shown most clearly in FIGS. 2 and 5, the portion of wiper assembly 161 is slide into the invention 100 for protection. The wiper assembly 161 is later removed from the invention 100 before the vehicle is operated.

The following definitions were used in this disclosure:

Cone: As used in this disclosure, a cone is a surface that is generated by rotating a triangle around one of the legs of the triangle. If a line that is perpendicular to the base that is drawn from the center of the base goes through the vertex of the triangle then the cone is called a right cone.

Correspond: As used in this disclosure, the term correspond is used as a comparison between two or more objects wherein one or more properties shared by the two or more objects match, agree, or align almost exactly.

Form Factor: As used in this disclosure, the term form factor refers to the size and shape of an object.

Prism: As used in this disclosure, a prism is a 3 dimensional geometric structure wherein: 1) the form factor of two faces of the prism correspond to each other; and, 2) the two corresponding faces are parallel to each other. In this disclosure, when further description is required a prism will be named for the geometric or descriptive name of the form factor of the two corresponding faces. If the form factor of the two corresponding faces has no clearly established or well-known geometric or descriptive name, the term irregular prism will be used.

Vehicle: As used in this disclosure, a vehicle is a device that is used transporting carrying passengers, goods, or equipment. The term motorized vehicle refers to a vehicle can move under power provided by an electric motor or an internal combustion engine.

Vertex: As used in this disclosure, a vertex (plural vertices) is an angle that is formed by two lines that form a point. Vertices are commonly found in polygons.

With respect to the above description, it is to be realized that the optimum dimensional relationship for the various components of the invention described above and in FIGS. 1 through 5, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, The inventor claims:

1. A container comprising:
a tray and a top cap;
wherein the container is adapted for use with a windshield wiper assembly;
wherein the container is adapted for use during inclement weather;
wherein the windshield wiper assembly is stored within the container;
wherein the windshield wiper assembly is formed in the shape of an irregular prism;
wherein the tray is a hollow structure;
wherein the windshield wiper assembly is adapted to be stored within the tray;
wherein the tray further comprises a boot, a plurality of contact points, and a first plurality of latch ridges;
wherein the plurality of contact points are attached to the boot;
wherein the first plurality of latch ridges are attached to the boot;
wherein the boot is a trough shaped prism structure;
wherein the boot further comprises a V shaped structure;
wherein an edge of the boot that is distal from the V shaped structure is open;
wherein the boot receives the windshield wiper assembly;
wherein the V shaped structure receives the windshield wiper assembly such that the wiper blade will fit into the V shaped structure;
wherein the tray further comprises a first edge and a second edge;
wherein the first edge is distal from a vertex;
wherein the first edge runs in a direction parallel to the vertex;
wherein the second edge is distal from the vertex;
wherein the second edge runs in a direction parallel to the vertex;
wherein each of the plurality of contact points is a structure that projects away from the vertex in the direction away from the first edge and in the direction away from the second edge;
wherein each of the plurality of contact points is formed in the shape of a cone.

2. The container according to claim 1 wherein each of the first plurality of latch ridges is a ridge that is formed on the boot.

3. The container according to claim 2
wherein the first plurality of latch ridges further comprises a first latch ridge and a second latch ridge;
wherein the first latch ridge projects perpendicularly away from the boot as an extension of the first edge in a direction away from the second edge;
wherein the second latch ridge projects perpendicularly away from the boot as an extension of the second edge in a direction away from the first edge.

4. The container according to claim 3
wherein a first top cap further comprises a chamber and a second plurality of latch ridges;
wherein the chamber is a hollow U shaped prism;
wherein the chamber is further defined with a third edge and a fourth edge;
wherein the span between the third edge and the fourth edge is defined as a gap;
wherein the span of the gap is sized such that the chamber will fit over the tray;
wherein the span of the gap is open.

5. The container according to claim 4 wherein each of the second plurality of latch ridges is a ridge that is formed on the chamber.

6. The container according to claim 5
wherein the second plurality of latch ridges further comprises a third latch ridge and a fourth latch ridge;
wherein the third latch ridge projects perpendicularly away from the chamber as an extension of the third edge in a direction towards the fourth edge;
wherein the fourth latch ridge projects perpendicularly away from the chamber as an extension of the fourth edge in a direction towards the third edge.

* * * * *